United States Patent [19]

Jackson

[11] 4,243,070

[45] Jan. 6, 1981

[54] VARIABLE BACK PRESSURE VALVE

[76] Inventor: Samuel G. Jackson, P.O. Box 16587, Lubbock, Tex. 79490

[21] Appl. No.: 933,989

[22] Filed: Aug. 16, 1978

[51] Int. Cl.³ .............................................. F16K 7/17
[52] U.S. Cl. .................................. 137/510; 137/859; 251/331
[58] Field of Search ............... 137/510; 251/331; 137/115, 859

[56] References Cited

U.S. PATENT DOCUMENTS

| 2,447,695 | 8/1948 | Folke | 137/510 X |
| 2,603,231 | 7/1952 | Birkemeier | 137/510 X |
| 2,678,187 | 5/1954 | Peters | 137/510 X |
| 2,888,947 | 6/1959 | Montgomery et al. | 137/510 X |

FOREIGN PATENT DOCUMENTS 76671  11/1953  Denmark ............................ 137/510

*Primary Examiner*—Arnold Rosenthal
*Attorney, Agent, or Firm*—Clarence A. O'Brien; Harvey B. Jacobson

[57] ABSTRACT

A back pressure valve employing a spring loaded diaphragm normally closing a discharge port or orifice combined with a push rod extending externally of the valve for coupling with a control actuator with the inner end of the push rod being operatively associated with the diaphragm for using an external control system for varying or regulating the back pressure in a fluid flow line. In one embodiment of the invention, the push rod is engaged directly with the diaphragm assembly, whereas in a second embodiment of the invention, the push rod is engaged with the spring which in turn is engaged with the diaphragm assembly. In both embodiments of the invention, a weak spring is associated with the diaphragm to bias the diaphragm to a closed position to prevent passage of air to a pump intake in the event the system is shutdown with the control actuator and push rod in a position to leave the diaphragm open or to relieve pressure on the heavier main diaphragm spring.

4 Claims, 3 Drawing Figures

U.S. Patent
Jan. 6, 1981
4,243,070
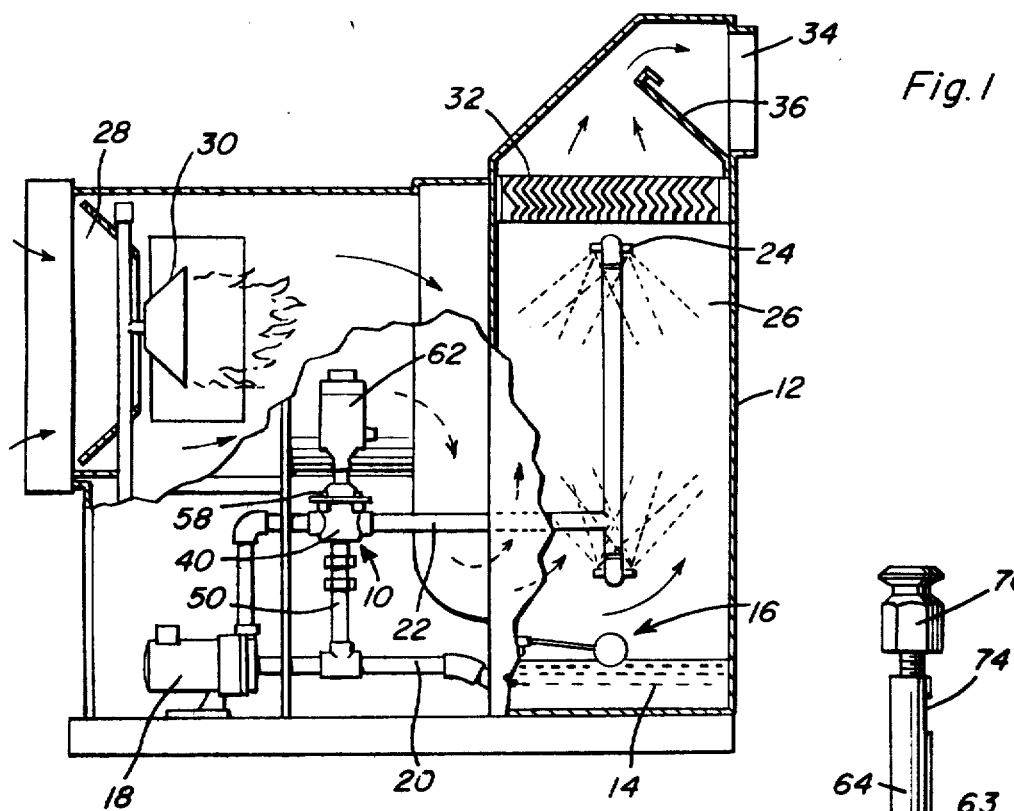
Fig. 1
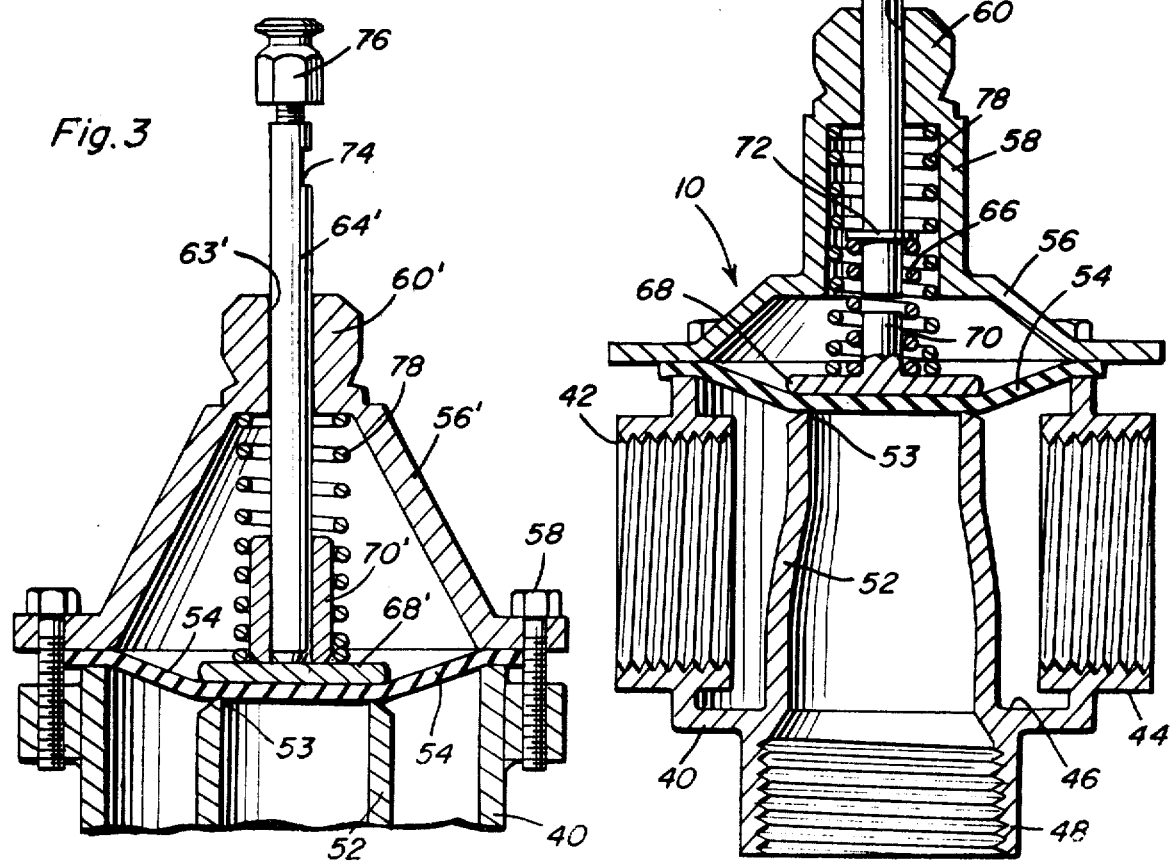
Fig. 2
Fig. 3

VARIABLE BACK PRESSURE VALVE

BACKGROUND OF THE INVENTION

1. Field of the Invention

The present invention generally relates to back pressure valves which employ a spring loaded diaphragm to close a discharge port and more particularly to a valve having means for varying the controlled pressure in a flow line in response to external control system utilizing a conventional control actuator.

2. Description of the Prior Art

Back pressure valves in flow lines are conventionally in the form of a diaphragm valve spring biased into closed relationship to an exhaust port or orifice in which the center portion of the diaphragm or a seal or valve member positioned thereon engages and closes the exhaust orifice and the fluid to be controlled engages the diaphragm externally of the exhaust orifice and exerts pressure on the annular portion of the diaphragm between the exhaust orifice and the periphery of the diaphragm which is normally clamped between two components of the valve housing. When the pressure in the control fluid is sufficient to overcome the spring force, the diaphragm and the seal thereon which engages the exhaust orifice is lifted from the exhaust orifice thus allowing fluid to escape and lowering the pressure to the desired level. Conventionally, the controlled pressure is adjusted by means of a screw threaded member which bears axially against the outer end of a diaphragm spring with the screw threaded member extending through the housing and being accessible from the exterior of the valve. Once the screw threaded member has been adjusted, the back pressure valve will maintain relatively constant pressure in the controlled fluid. The primary variation in the controlled pressure is caused by the necessary compression of the spring as the diaphragm lifts to permit passage of fluid into the exhaust orifice. For this reason, such valves usually employ a relatively long compression spring in order to have a low spring constant so that it will maintain a more constant pressure.

The following U.S. patents illustrate back pressure valves generally of this type:

U.S. Pat. No. 1,924,896—Aug. 29, 1933
U.S. Pat. No. 2,041,906—May 26, 1936
U.S. Pat. No. 2,591,432—Apr. 1, 1952
U.S. Pat. No. 2,600,554—June 17, 1952
U.S. Pat. No. 2,669,249—Feb. 16, 1954
U.S. Pat. No. 2,745,254—May 15, 1956
U.S. Pat. No. 3,307,568—Mar. 7, 1967
U.S. Pat. No. 3,311,124—Mar. 28, 1967
U.S. Pat. No. 3,556,125—Jan. 19, 1971
U.S. Pat. No. 3,918,470—Nov. 11, 1975.

In many instances, it is desirable to vary the back pressure in a fluid flow line and in such instances, the above described conventional back pressure valves cannot be used since they do not enable a variation in the controlled pressure. For example, it is desirable to provide a variable back pressure in the water pressure delivered to the spray nozzles in an air washer in order to vary the effectiveness of the air washer and thereby produce air of controlled relative humidity. While controlled relative humidity has been accomplsihed by bypass dampers and other control measures, such arrangements are relatively complex and difficult to maintain in proper condition for accurate controlled relative humidity.

SUMMARY OF THE INVENTION

An object of the present invention is to provide a variable back pressure valve in which the controlled fluid pressure in a fluid flow line is varied in response to an external control system having a conventional control actuator operatively associated with a diaphragm valve which is provided with a spring to bias the diaphragm to a closed relationship to an exhaust orifice with a push rod being operatively associated with the control actuator and the diaphragm in order to vary the controlled pressure in response to the external control actuator.

Another object of the invention is to provide a variable back pressure valve in which the push rod is directly connected with the diaphragm assembly of the back pressure valve.

Still another object of the invention is to provide a variable back pressure valve in accordance with the preceding object in which the connection between the pushrod and diaphragm valve includes a sleeve slidably receiving the inner end of the push rod and a weak spring is provided to close the diaphragm valve when fluid flow ceases and the push rod is not in position to close the diaphragm to prevent intake of air into the flow line.

A further object of the invention is to provide a variable back pressure valve in which the push rod is connected with the diaphragm through the main diaphragm spring with an additional weak spring being provided to close the diaphragm when the fluid flow ceases thereby maintaining the diaphragm in closed position regardless of the position of the external control actuator for preventing intake of air into a pump which may be communicated with the fluid flow line.

Still another important object of the present invention is to provide a variable back pressure valve capable of varying the controlled pressure automatically in response to an external control system in which the back pressure valve is a conventional diaphragm valve having a compression coil spring biasing the diaphragm to a closed relationship to an exhaust orifice combined with a novel modification of the diaphragm valve which includes a push rod assembly extending into the interior of the valve housing with its inner end operatively associated with the diaphragm assembly and its outer end operatively associated with an external control actuator for automatically varying the opening and closing characteristics of the diaphragm valve in response to the external control actuator.

Still another feature of the present invention is to provide a variable back pressure valve which is relatively simple in construction, easy to install, maintain and control and adapted to be used in many installations where back pressure variations are desired.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a schematic view illustrating a typical installation of the variable back pressure valve in a humidifier.

FIG. 2 is an enlarged vertical sectional view of one embodiment of the back pressure valve of the present invention.

FIG. 3 is a fragmentary sectional view of another embodiment of the back pressure valve.

DESCRIPTION OF THE PREFERRED EMBODIMENTS

Referring now specifically to the drawing, the numeral 10 generally designates the variable back pressure valve of the present invention with FIG. 1 illustrating one contemplated use of the invention in a humidifier which includes a housing 12 provided with a tank or other water supply means 14, the level of which is controlled by a conventional float operated valve assembly 16 with a pump 18 pumping water from the water supply 14 through a pipe or conduit 20 and discharging the water through a flow line or discharge pipe 22 for discharging water droplets or mist from a plurality of spray nozzles 24 arranged in a plenum or air flow chamber 26. Air is entrained through an intake 28 which includes a burner assembly 30 for discharging heated air through the air chamber 26 for entrainment of the moisture. The spray nozzles and moisture serves as an air washer and the heated air vaporizes the spray and the humid air then passes through a zigzag baffle arrangement 32 which eliminates water droplets, and the like, and is then discharged from a discharge opening 34 after is passes over a baffle 36. All of the foregoing represents conventional humidifier structure which has been commercially available and includes external controls for operating the pump and/or heater to maintain the desired output characteristics depending upon the installational requirements. One installation in which the humidifier described above is in conjunction with a cotton ginning operation where large volumes of warm humid air is blown into the cotton in various places in the gin plant. With the water pump turned off, the device can serve as a drying heater and maintaining a controlled temperature and humidity in various locations in a cotton ginning plant provide significant advantages in the ginning operation. Automatic controls have been provided for the above-mentioned humidifier in order to maintain air temperature within certain limits at various points in the system by controlling a fuel valve and control is also provided for the water pump and balancing operation of the burner and operation of the pump 18 provides control of the temperature and relative humidity of air discharged from the humidifier. However, simply turning the pump on or off does not provide the requisite uniform humidification and in order to provide such uniform humidification, the discharge flow line 22 is provided with the variable back pressure valve 10 of the present invention.

The back pressure valve 10 includes a housing 40 having a pair of inlet adapters 42 and 44 connected to the flow line 22 by suitable connections such as a screw threaded connection, or the like, so that the flow line 22 is in communication with the interior 46 of the housing. The housing 40 includes a downwardly extending discharge port 48 which is provided with a screw threaded or other connection to a bypass line 50 which connects into the pump intake line 20 as illustrated in FIG. 1 or may discharge back into the water supply 16 or be provided with a discharge to any desired location. The discharge port 48 includes an upwardly extending tubular extension 52 into the interior 46 of the housing 40 and terminating in an upper edge 53 defining an exhaust orifice in communication with the discharge port 48 and also providing a valve seat for engagement by a flexible diaphragm 54 which has its periphery received between the upper edge of the housing 40 and a dome-type cap 56 secured to the housing by suitable screw threaded fasteners in the form of bolts 58, or the like. The above described structure is conventional in a diaphragm valve and, in some instances, the diaphragm itself 54 may be used as the valve member as illustrated or a separate seal may be provided on the undersurface of the diaphragm for engagement with the valve seat 53.

The cap 56 is provided with an upwardly extending cylindrical housing 58 of unitary construction and provided with an undercut, machined boss 60 at its upper end which is shaped to mount a conventional, commercially available electric or pneumatic actuator 62 thereon so that the external actuator 62 is mounted directly and rigidly to the valve 10. The upstanding housing 58 and boss 60 includes a vertical bore 63 slidably receiving a push rod 64 which has its lower end telescoped into a compression coil spring 66 which is the main closure spring for the diaphragm 54. The alignment of the main spring 66 and push rod 64 is maintained by the extension of push rod 64 into main spring 66. The lower end of the main spring 66 engages a plate 68 engaged with the upper surface of the diaphragm 54 and which includes an upwardly extending projection 70 telescoped into the lower end of the main spring 66 in order to maintain the spring 66 properly associated with the diaphragm 54. The push rod 64 is provided with a snap ring 72 which defines a shoulder that engages the upper end of the main spring 66 and maintains pressure on the main spring 66 in accordance with the position of the push rod 64. By varying the vertical position of the push rod 64, the pressure exerted on the diaphragm 54 by the spring 66 may be varied. The lower end of the push rod 64 is spaced from the upper end of the projection 70 sufficient to enable the spring 66 to be compressed by fluid pressure in the housing of the valve so that when the fluid pressure reaches a predetermined level, it will move the diaphragm 54 off of the valve seat 53 and permit discharge of fluid through the discharge port 48. By varying the position of the push rod 64, the pressure exerted by the spring 66 may be varied, thereby varying the controlled pressure in the flow line 22, thereby controlling the back pressure of the fluid to vary the discharge characteristics of the water from the spray nozzles 24.

The other end of the push rod 64 is provided with a notch or wrench flat 74 and an adjustable grooved nut 76 screw threaded onto the upper end of the push rod with the grooved nut facilitating connection of the push rod to the external control actuator 62 so that the actuator 62 can move the push rod 64 vertically to vary the pressure exerted by the spring 66 on the diaphragm 54 thereby varying the controlled pressure.

A longer and weaker compression coil spring 78 is disposed internally of the cylindrical housing 58 with the upper end abutting a shoulder forming the bottom of the boss 60 and the lower end engaging the plate 68 in engagement with the diaphragm 54 with the spring 78 enclosing the spring 66. This spring will not materially affect the operation of the diaphragm 54 and spring 66 but will move the diaphragm 54 to a closed position in the event the water system is shutdown, thus precluding the possibility of air being drawn into the intake of the pump when the pump is started. Thus, the spring 78 is sufficiently strong to close the diaphragm when no pressure exists in the flow line but the pressure of the spring 78 will be substantially constant and relatively small as compared to the pressure exerted by the spring 66 and will not alter the variable back pressure characteristics obtained by varying the pressure exerted by the spring 66 by varying the position of the push rod 64.

The embodiment of the invention illustrated in FIG. 3 also encompasses the use of a conventional diaphragm valve with all of the components of the valve housing and diaphragm being the same along with certain other components designated by the same reference numerals. In this embodiment of the invention, the dome cap 56' is shown in a slightly different form but it is functionally the same as that illustrated in FIG. 2. In this arrangement, spring 78, identical to spring 78 in FIG. 2, extends between the undersurface of the boss 60' and the plate 68' engaging the upper surface of the diaphragm 54. In this embodiment, the plate 68' includes a unitary upstanding projection 70' which is hollow or tubular but telescopes into the lower end of the spring 78 to form a guide therefor. The tubular projection 70' receives the lower end of a push rod 64' which is slidably received in a bore 63' in the boss 60' and provided with a notch and adjustable groove nut assembly at the upper end thereof in the same manner as in FIG. 2.

By constructing the diaphragm 54 of Neoprene having a thickness of approximately three mm with one ply of nylon reinforcement, good results have been obtained without the use of a separate seal or valve member engaging the valve seat 53. The push rod is moved by a standard control actuator to compress the outer end of the valve spring toward the diaphragm and thus produce a controlled back pressure in FIG. 2. In the conventional back pressure valve, the spring is made as long as possible consistent with the force required in order that the controlled pressure might vary as little as possible with differing flow rates. The spring 66 illustrated in FIG. 2 may be considered a shortened spring so as to give the desired range of force when compressed by the linear movement of the control actuator and push rod. The push rod connection at the upper end thereof is adapted to receive the control arm of commercially available electric or pneumatic actuators, such as manufactured by Honeywell, Inc. Such a valve actuator includes an electric model known as a Modutrol which includes a single phase reversible motor operating through 160° and a valve operating linkage which uses a cam to produce a linear motion. In situations where the spring 66 will not exert any force against the diaphragm 54 at the fartherest extension of the push rod 64, the weak spring 78 is used in parallel with the spring 66 to push the diaphragm against the exhaust orifice when the pump supplying pressure is turned off. This prevents air from passing through the back pressure valve to the pump intake thus causing problems when the pump is restarted. The dimensional relationship of the exhaust orifice and the active diameter of the diaphragm are such that the area of the annulus on which the fluid presses is adequate to lift the diaphragm from the exhaust orifice but is not so great as to require an unreasonable mechanical force to operate the valve.

In the arrangement illustrated in FIG. 3, the push rod, in effect, forms a solid connection with the diaphragm in order to force it against the exhaust orifice or to permit the diaphragm to be moved away from the exhaust orifice when pressure is exerted thereon. The weak spring 78 functions to close the diaphragm 54 when fluid flow ceases in order to prevent intake of air in the same manner as in FIG. 2. In this arrangement, most of the pressure variation occurs in a small portion of the actuator stroke. The boss in both embodiments of the invention is adapted to receive existing Honeywell products, such as the MP953 series of pneumatic actuators or the Q618A1008 valve linkage with any of the many Modutrol motors available, although it is pointed out that other similar actuators can be used. The position of the groove nut 76 may be varied, thus varying the force exerted on the spring 66 by varying the effective length of the push rod 64. The notch or wrench flat 74 facilitates adjustment of the groove nut. Also, in certain installations only a single inlet port is used in the housing and in some instances the weak spring 78 may be omitted.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a back pressure valve comprising a valve body including port means enabling fluid flow into the body, an exhaust orifice in said valve body, a diaphragm normally closing the exhaust orifice and being lifted from the exhaust orifice for discharging fluid therethrough, that improvement comprising a rod extending into the valve body and longitudinally movable with respect thereto with the inner end of the rod being operatively associated with the diaphragm and the outer end of the rod being operatively associated with an external control actuator to alter the opening and closing characteristics of the diaphragm, said diaphragm is held closed against fluid pressure in the body by a main coil spring, said rod including a ring mounted thereon for engagement with the end of the main spring remote from the diaphragm for varying the pressure exerted on the diaphragm by the spring, said valve includes a weak coil spring encircling the push rod and main coil spring engaged by the push rod with the inner end of the weak spring engaging the diaphragm to close the diaphragm in the event fluid flow ceases and pressure is removed from the diaphragm and main spring engaged with the rod by movement of the push rod outwardly thereby preventing entry of air through the exhaust orifice, the inner end of the rod extending into the main spring for maintaining the main spring and push rod in aligned relation.

2. The structure as defined in claim 1 wherein said rod includes means on its outer end for adjustable connection with an external control actuator.

3. The structure as defined in claim 2 wherein said adjustable connection means comprises an adjustable grooved nut screw threaded onto the upper end of the push rod.

4. The structure as defined in claim 2 wherein said external control actuator is an automatic control actuator.

* * * * *